(12) United States Patent
Sugiyama et al.

(10) Patent No.: US 9,760,127 B2
(45) Date of Patent: Sep. 12, 2017

(54) INFORMATION PROCESSING APPARATUS

(71) Applicant: PANASONIC INTELLECTUAL PROPERTY MANAGEMENT CO., LTD., Osaka (JP)

(72) Inventors: Hirokazu Sugiyama, Fukuoka (JP); Yoshihide Nakashima, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 14/667,751

(22) Filed: Mar. 25, 2015

(65) Prior Publication Data
US 2015/0277501 A1   Oct. 1, 2015

(30) Foreign Application Priority Data

Mar. 28, 2014  (JP) .................................. 2014-069494

(51) Int. Cl.
*G06F 1/16* (2006.01)
*G06F 21/86* (2013.01)

(52) U.S. Cl.
CPC ............ *G06F 1/1656* (2013.01); *G06F 21/86* (2013.01)

(58) Field of Classification Search
CPC ......... G06F 1/1656; G06F 21/86; G06F 21/88
See application file for complete search history.

(56) References Cited

U.S. PATENT DOCUMENTS

| 4,811,288 | A | * | 3/1989 | Kleijne | G06F 21/71 |
| | | | | | 340/652 |
| 4,972,175 | A | * | 11/1990 | MacPherson | B60R 25/10 |
| | | | | | 109/42 |
| 5,597,982 | A | * | 1/1997 | Hiwada | G01R 1/0466 |
| | | | | | 174/254 |

(Continued)

FOREIGN PATENT DOCUMENTS

| EP | 347209 | 12/1989 |
| EP | 1160647 | 12/2001 |

(Continued)

OTHER PUBLICATIONS

Extended European Search Report (EESR) from European Patent Office (EPO) dated Jul. 30, 2015 for the related European Patent Application No. 15160689.4.

*Primary Examiner* — David M Sinclair
*Assistant Examiner* — Robert Brown
(74) *Attorney, Agent, or Firm* — Greenblum & Bernstein, P.L.C.

(57) ABSTRACT

A settlement processing apparatus as an information processing apparatus includes a first substrate, a second substrate which is provided so as to face the first substrate, a frame member which supports the first substrate and the second substrate on the inner surface side of a wall surface portion surrounding the external forms of the first substrate and the second substrate, and a tamper detection circuit which is disposed within a secure region surrounded by the first substrate, the second substrate, and the frame member and detects the release of blocking of the secure region. An information processing apparatus which is small, secures the degree of freedom in design, and has high tamper resistance is provided.

20 Claims, 12 Drawing Sheets

(56) References Cited

U.S. PATENT DOCUMENTS

| | | | | |
|---|---|---|---|---|
| 5,938,472 | A * | 8/1999 | Yuen | H01H 3/16 439/509 |
| 5,970,146 | A * | 10/1999 | McCall | G06F 3/0416 345/173 |
| 6,245,992 | B1 * | 6/2001 | Hou | G06F 21/86 174/377 |
| 6,470,449 | B1 * | 10/2002 | Blandford | G06F 17/30958 340/5.8 |
| 6,646,565 | B1 | 11/2003 | Fu et al. | |
| 6,921,988 | B2 * | 7/2005 | Moree | G06F 21/83 307/116 |
| 6,970,360 | B2 * | 11/2005 | Sinha | G06F 21/86 174/541 |
| 7,047,559 | B2 * | 5/2006 | Ohmori | G06Q 20/02 726/3 |
| 8,595,514 | B2 * | 11/2013 | Mirkazemi-Moud | G06F 1/1626 340/539.1 |
| 9,036,366 | B2 | 5/2015 | Takemori et al. | |
| 9,215,799 | B2 | 12/2015 | Takemori et al. | |
| 2002/0002683 | A1 * | 1/2002 | Benson | G06F 21/86 713/194 |
| 2003/0009683 | A1 * | 1/2003 | Schwenck | G06F 21/87 713/194 |
| 2003/0137416 | A1 * | 7/2003 | Fu | G06F 21/86 340/568.1 |
| 2004/0024710 | A1 * | 2/2004 | Fernando | G06F 21/6218 705/50 |
| 2004/0167820 | A1 * | 8/2004 | Melick | G06Q 20/20 705/16 |
| 2006/0049941 | A1 * | 3/2006 | Hunter | G01R 22/066 340/545.6 |
| 2007/0041165 | A1 * | 2/2007 | Konno | H05K 3/301 361/760 |
| 2007/0115621 | A1 * | 5/2007 | Guillen | G06F 1/1601 361/679.26 |
| 2008/0028168 | A1 * | 1/2008 | Muraoka | G06F 12/1416 711/159 |
| 2008/0209212 | A1 * | 8/2008 | Ditzman | G06F 21/83 713/167 |
| 2009/0243872 | A1 * | 10/2009 | Takahashi | G06F 21/85 340/687 |
| 2010/0263031 | A1 * | 10/2010 | Tsuchiya | G06F 21/32 726/7 |
| 2011/0138464 | A1 * | 6/2011 | Ohta | G06F 21/74 726/22 |
| 2011/0294310 | A1 * | 12/2011 | Li | G06K 7/0034 439/74 |
| 2012/0050998 | A1 * | 3/2012 | Klum | G06F 21/86 361/720 |
| 2012/0062443 | A1 * | 3/2012 | Baldischweiler | G02F 1/1347 345/1.3 |
| 2012/0092812 | A1 * | 4/2012 | Lewis | A61B 5/14532 361/679.01 |
| 2012/0262850 | A1 * | 10/2012 | Lin | H01R 13/2421 361/679.01 |
| 2013/0050155 | A1 * | 2/2013 | Petersen | B81B 7/0067 345/204 |
| 2014/0162598 | A1 * | 6/2014 | Villa-Real | H04M 1/66 455/411 |
| 2014/0183260 | A1 * | 7/2014 | Sancak | G07G 1/0018 235/383 |

FOREIGN PATENT DOCUMENTS

| | | |
|---|---|---|
| EP | 1273997 | 1/2003 |
| JP | 2008-033593 | 2/2008 |
| JP | 2013-003979 | 1/2013 |
| WO | 01/63994 | 8/2001 |
| WO | 2008/077964 | 7/2008 |

* cited by examiner

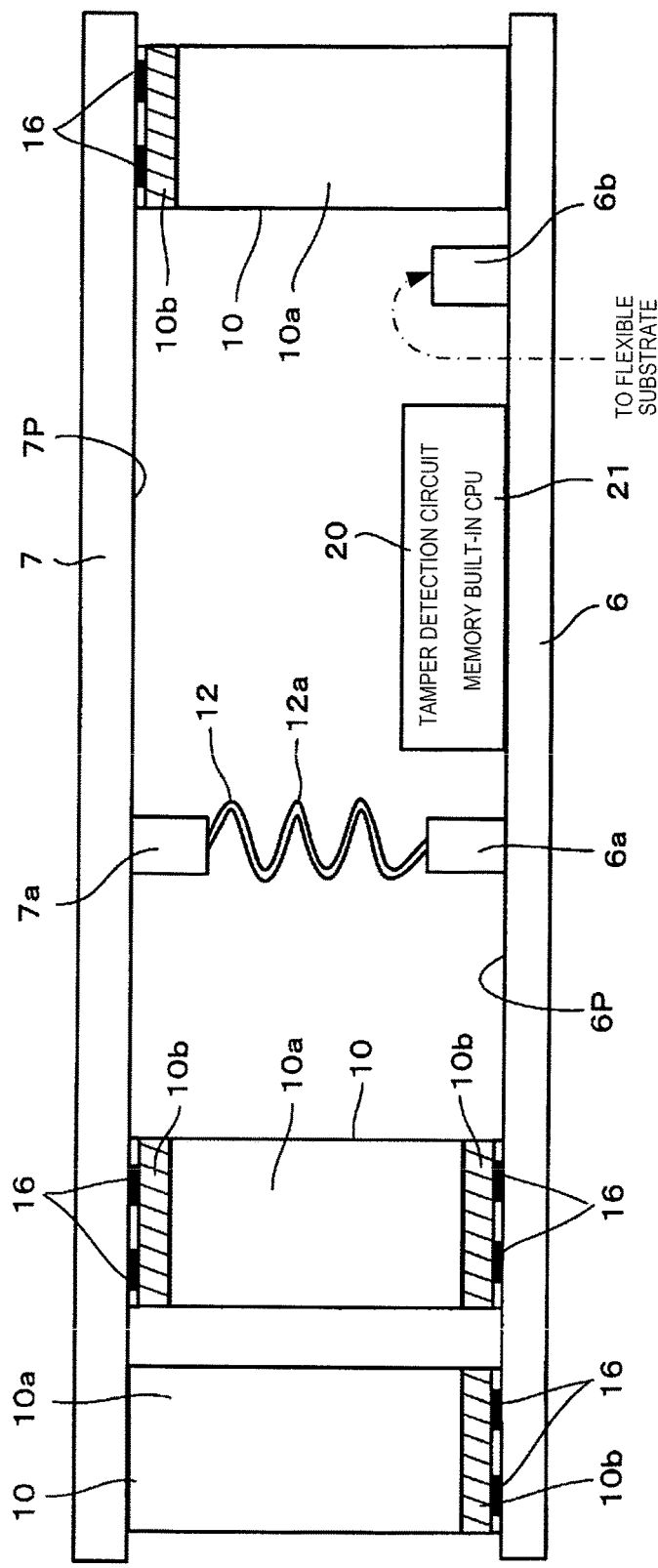

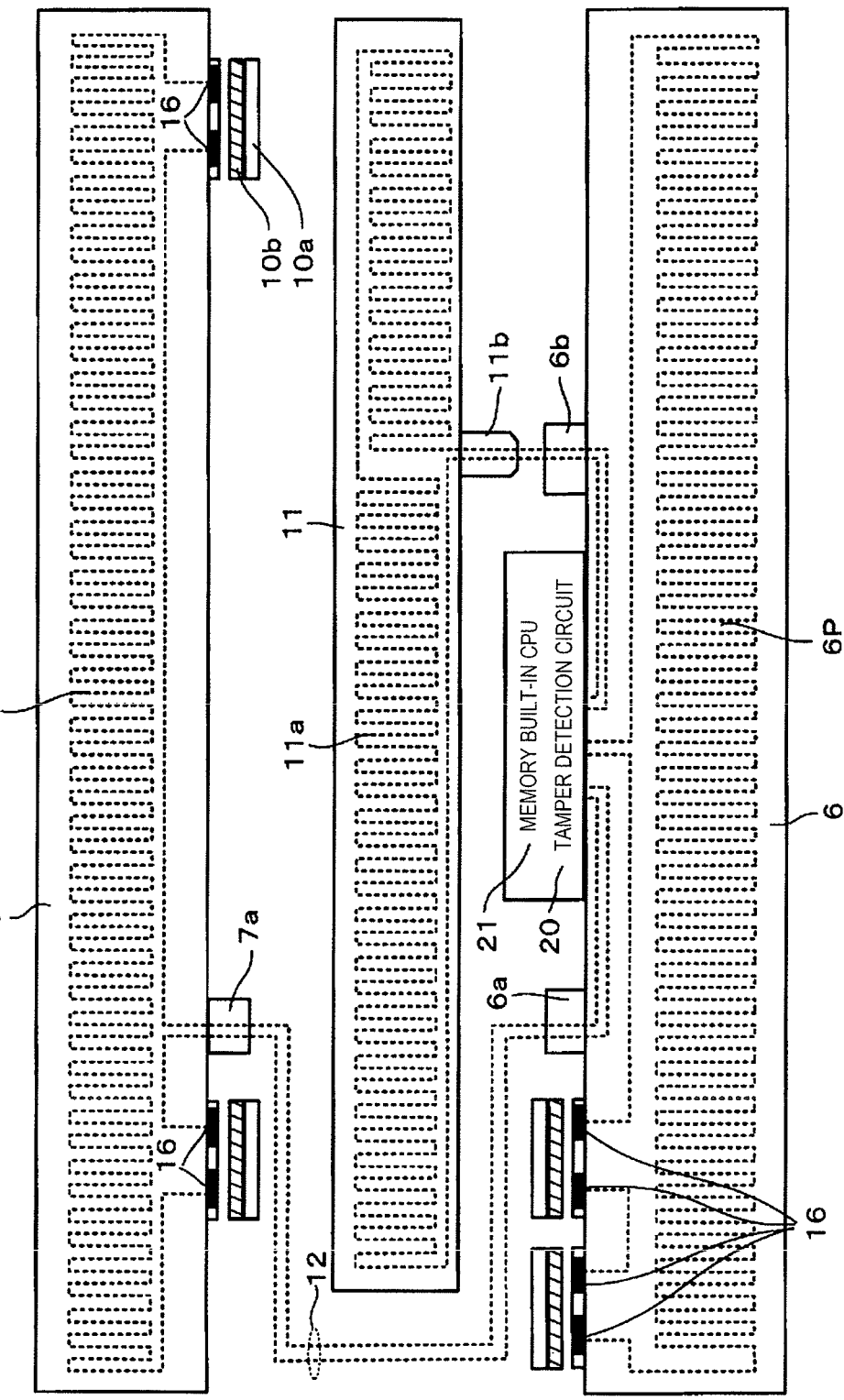

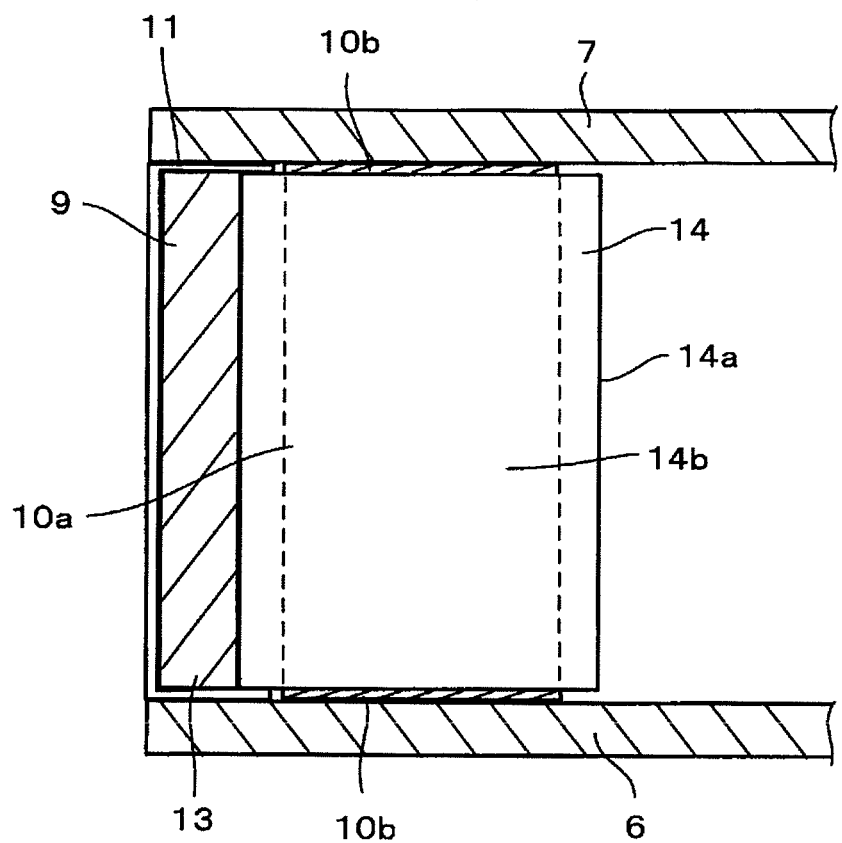

INFORMATION PROCESSING APPARATUS

BACKGROUND OF THE INVENTION

1. Field of the Invention

The present disclosure relates to an information processing apparatus which is used to perform settlement or a commercial transaction, and more particularly, to an information processing apparatus for a credit card, a debit card, electronic money, or the like.

2. Description of the Related Art

In recent years, the size and power consumption of a settlement processing apparatus used to perform settlement or a commercial transaction have been reduced with a remarkable development, which results in an increase in the use of portable settlement processing apparatuses. While the portable settlement processing apparatus has convenience of easy carrying, the chance for the portable settlement processing apparatus to be accessed by people other than regular device users increases, and thus there is an increasing risk that confidential information, such as an encryption key or personal information, serving as information to be protected which is stored in a settlement processing apparatus, is stolen. Proposals for protecting information to be protected from fraudulent actions have been made.

Japanese Patent Unexamined Publication No. 2013-003979 discloses an information processing apparatus including first and second circuit boards disposed within the apparatus body so as to be separated from and face each other, electronic components respectively disposed on the opposing surfaces of the first and second circuit boards, and a shielding member that surrounds outer circumferential portions of the first and second circuit boards. The above document discloses that the information processing apparatus further includes a detection circuit as a tamper detection unit and that the detection circuit is operated to erase data stored in a memory and prevent a fraudulent action from occurring when a hole is formed in a shielding member, provided with a detection line, by using a drill or the like.

Japanese Patent Unexamined Publication No. 2008-033593 discloses a data storage device including a memory, electric wires, a detection unit, and a control unit. The memory is provided within a housing. The electric wires are disposed at sufficiently small intervals with respect to the length or width of the surface of the housing so as to cover substantially the entire surface of the housing and are substantially narrow with respect to the length or width of the surface of the housing. The detection unit detects the disconnection of the electric wire. The control unit erases data stored in the memory when the disconnection of the electric wire is detected. The above document discloses that a tampering action such as the destruction or opening of the housing is monitored and that data is erased with respect to the tampering action.

However, the above-mentioned information processing apparatus of the related art is limited so that an open detection circuit, a CPU, a flash ROM, and an S-RAM are mounted on the same substrate. In the data storage device disclosed in Japanese Patent Unexamined Publication No. 2008-033593, the arrangement of circuit components between front and back surfaces on a main board is arbitrary, but six sides of the entire main board have to be surrounded by a protection board, which results in the necessity of a large space volume in a secure region. In order to improve security, a reduction in the dimension of a secure unit is one of the useful elements. However, the above-mentioned information processing apparatus of the related art has a problem that it is difficult to further reduce the size of a portion constituting the secure region.

SUMMARY OF THE INVENTION

An information processing apparatus of the present disclosure is small, secures the degree of freedom in design, and has high physical tamper resistance.

An information processing apparatus of the present disclosure includes a first substrate; a second substrate which is provided so as to face the first substrate; a frame member which includes a wall surface portion surrounding a secure region together with the first substrate and the second substrate; a tamper detection circuit which is disposed within the secure region and detects release of blocking of the secure region; and a substrate connection circuit which electrically connects the first substrate and the second substrate so as to cross the secure region and has a length greater than a distance between the first substrate and the second substrate.

With the above-mentioned configuration, the degree of freedom of the layout of a memory storing information to be protected, a tamper detection circuit, and a control unit (CPU or the like) that controls the memory and the tamper detection circuit is increased. A substrate connection circuit is easily accommodated in a secure region, and thus an assembling property is improved. Therefore, it is possible to reduce the size of the secure region while achieving a simple structure and easy assembling.

BRIEF DESCRIPTION OF DRAWINGS

FIG. 6 is a schematic diagram illustrating an example of a first exemplary embodiment of the secure region of the settlement processing apparatus according to the present disclosure;

FIG. 7 is a wiring diagram illustrating electrical connection of a wiring pattern of the first exemplary embodiment;

FIGS. 10A and 10B illustrate other exemplary embodiments of FIGS. 5A and 5B; FIG. 10A is a cross-sectional view taken along line A-A according to another exemplary embodiment based on FIG. 4, and FIG. 10B is a cross-sectional view taken along line B-B according to another exemplary embodiment based on FIG. 4.

DETAILED DESCRIPTION OF THE PREFERRED EMBODIMENT

Hereinafter, preferable exemplary embodiments of a settlement processing apparatus as an information processing apparatus according to the present disclosure will be described in detail with reference to FIGS. 1 to 11.

Figure 1:
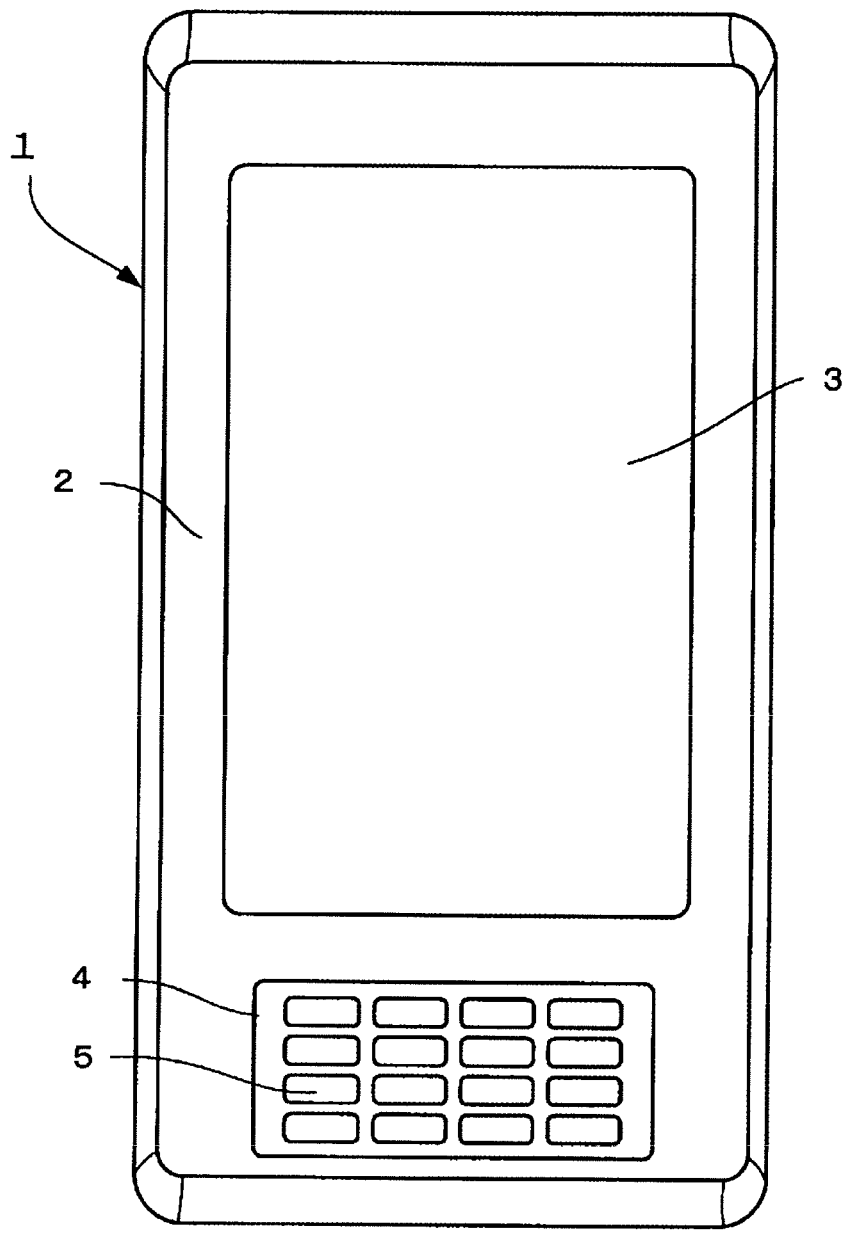
FIG. 1 is a front view illustrating an example of a settlement processing apparatus as an information processing apparatus according to the present disclosure.
Figure 2:
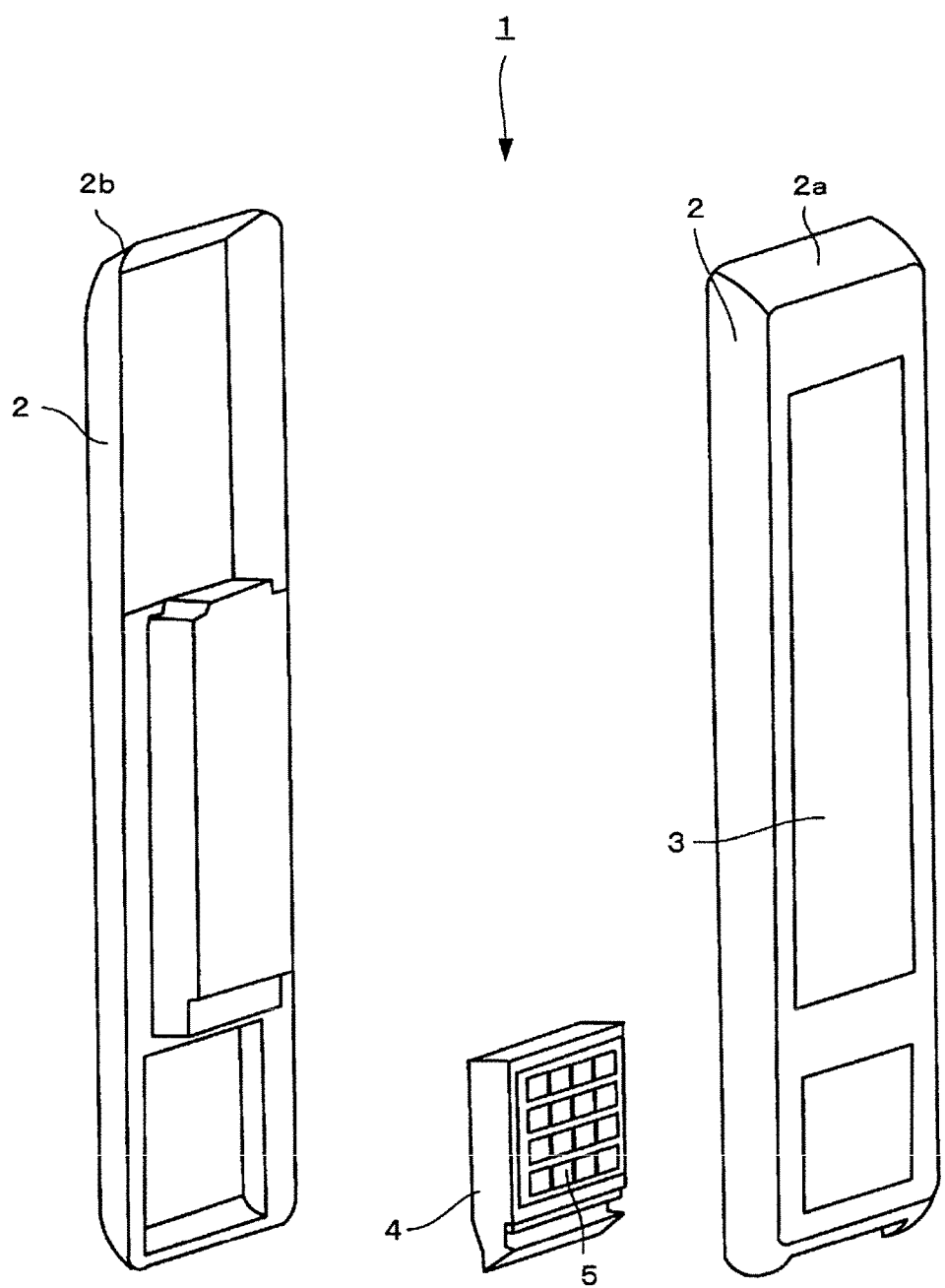
FIG. 2 is an exploded perspective view illustrating an example of the settlement processing apparatus according to the present disclosure.
Figure 3:
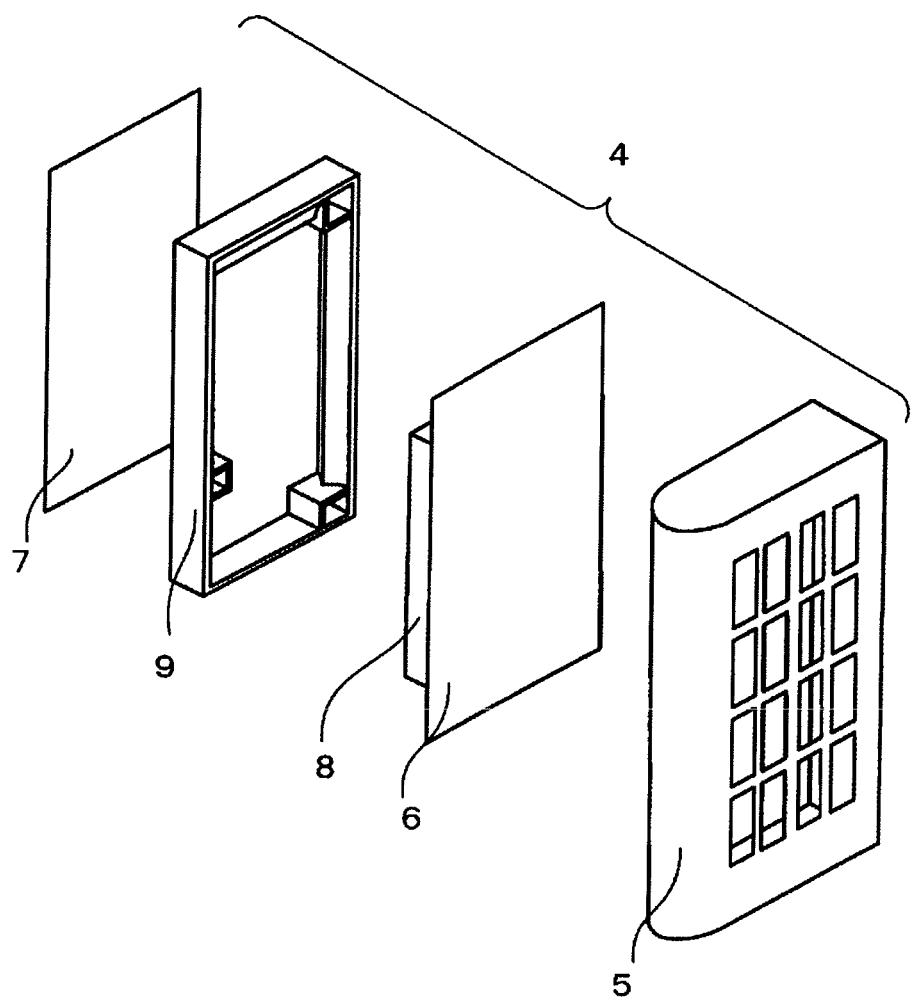
FIG. 3 is an exploded perspective view illustrating an example of an operation unit of the settlement processing apparatus according to the present disclosure.

The exterior of the settlement processing apparatus will be described below with reference to FIGS. 1 to 3.

Settlement processing apparatus 1 includes housing 2, and input and display unit 3 and operation unit 4 which are provided within housing 2. Housing 2 is constituted by first case 2a and second case 2b, and components necessary for settlement processing apparatus 1 are accommodated in a storage chamber defined by first case 2a and second case 2b. Input and display unit 3 is constituted by a display (display unit) such as a liquid crystal panel or an organic EL panel and a user interface (UI) type touch panel (input unit) that performs various types of processing by being touched using a finger or a stylus pen, and performs the input and display of a settlement amount and a payment method and the input and display of various types of operations. Operation unit 4 includes keyboard unit 5 in which keys necessary for a settlement process are arranged, first substrate 6, second substrate 7, electronic component 8, and frame member 9.

Now, an example of the configuration of secure region S according to the present disclosure will be described in detail with reference to FIG. 4.

Figure 4:
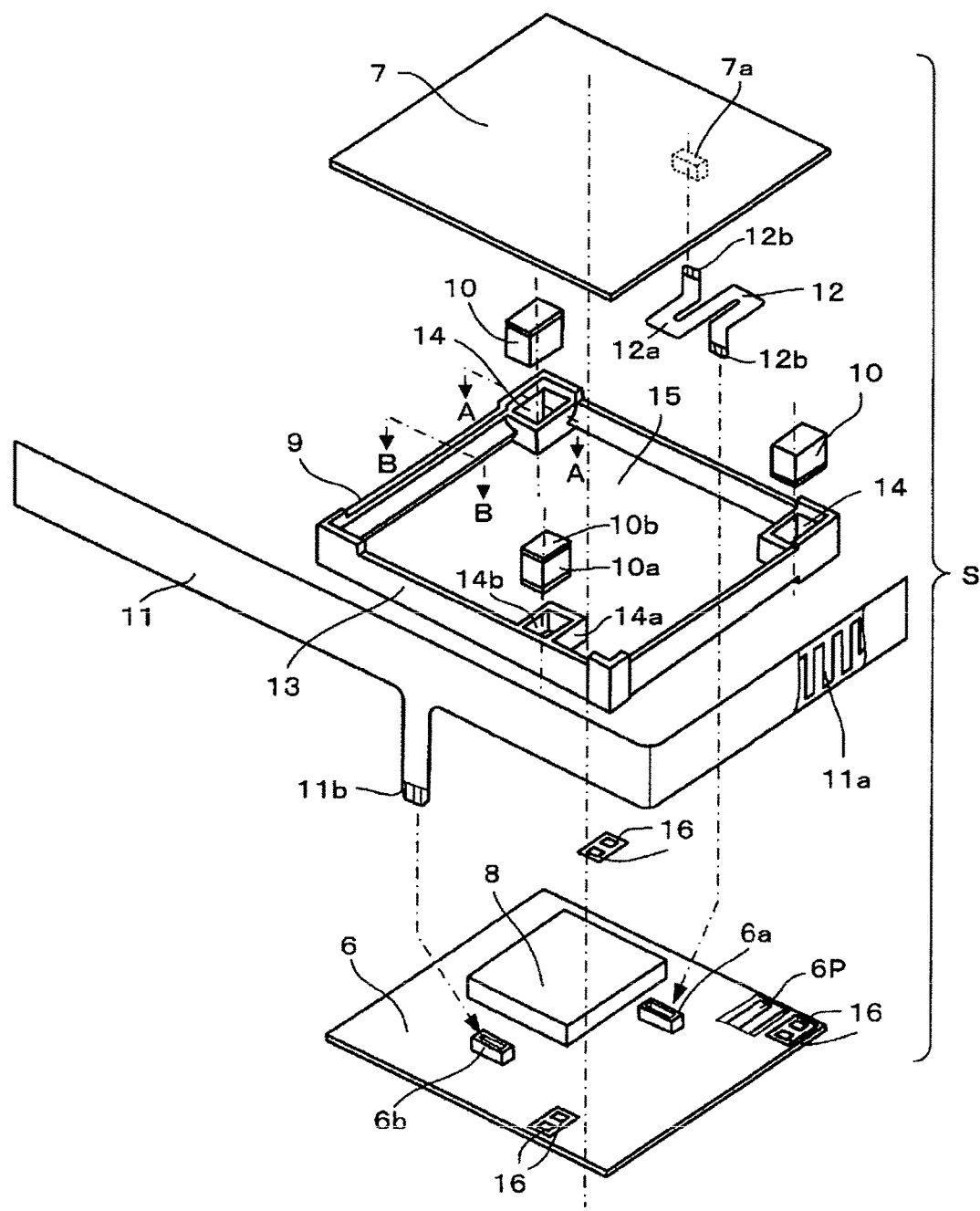
FIG. 4 is an exploded perspective view illustrating an example of a secure region of the settlement processing apparatus according to the present disclosure.

As illustrated in FIG. 4, secure region S includes first substrate 6, second substrate 7, electronic component 8, frame member 9, conductive member 10, flexible substrate 11, and substrate connection circuit 12. In this exemplary embodiment, electronic component 8 having a memory and tamper detection circuit 20 (described later) built therein is mounted on first substrate 6 having a substantially quadrangular shape. The memory stores information to be protected (confidential information such as personal information, for example, an encryption key or a personal identification number (PIN)). The tamper detection circuit detects whether or not a physical fraudulent action has been performed. In addition, second substrate 7 having a substantially quadrangular shape is provided so as to face the surface of first substrate 6 on which electronic component 8 is mounted, and is disposed so as to cover electronic component 8.

First substrate 6 and second substrate 7 are fitted to frame member 9 having a substantially quadrangular shape. Frame member 9 includes wall surface portion 13 that determines the external form of frame member 9, a plurality of elastic member mounting portions 14 integrally formed with wall surface portion 13, and through hole 15 defined on the inner side of wall surface portion 13 and elastic member mounting portion 14. Wall surface portion 13 is provided along the whole circumference of frame member 9 so as to surround electronic component 8, and frame member 9 is formed to have a shape closed in a circumferential direction by wall surface portion 13.

Elastic member mounting portion 14 is provided with opening 14b which is defined by wall portion 14a formed integrally with frame member 9 and of which both ends are opened, and conductive member 10 is mounted into opening 14b. That is, a space having conductive member 10 mounted therein is secured by opening 14b. Conductive member 10 includes elastic member 10a which is an electric insulator and conductive film (conductive membrane) 10b which is formed on the surface of elastic member 10a. Conductive film 10b may be formed by applying, for example, a conductive material thereto, by attaching a sheet formed of a conductive material, by attaching a conductive elastic material, or by being molded integrally with elastic member 10a. The assembling property of settlement processing apparatus 1 is improved by a simple structure described above.

First substrate 6 and second substrate 7 are supported by the internal side surface of wall portion 14a and the upper and lower surfaces of elastic member mounting portion 14 and are disposed in through hole 15, and a space including through hole 15 is formed between first substrate 6 and second substrate 7. The external forms of first substrate 6 and second substrate 7 when seen in a plan view are smaller than the external form of frame member 9 when seen in a plan view. First substrate 6 and second substrate 7 may be supported by the upper and lower surfaces of wall portion 14a. The external forms of first substrate 6 and second substrate 7 when seen in a plan view may be substantially the same as the external form of frame member 9 when seen in a plan view. The electrical connection between first substrate 6 and second substrate 7 is performed using first connector 6a provided in first substrate 6 and second connector 7a provided in second substrate 7 through substrate connection circuit 12.

Substrate connection circuit 12, which is a flexible foldable substrate having folded portion 12a, has a length larger than a distance between first substrate 6 and second substrate 7 and crosses through hole 15 which is a space surrounded by first substrate 6, second substrate 7, and frame member 9. That is, substrate connection circuit 12 is accommodated in a protection region surrounded by first substrate 6, second substrate 7, and frame member 9. With the above-mentioned configuration, substrate connection circuit 12 is easily accommodated in secure region S, and thus an assembling property is improved. In addition, substrate connection circuit 12 includes connection portion 12b at both ends thereof, and is electrically connected to substrate wiring patterns 6P and 7P of first substrate 6 and second substrate 7 which will be described later. First substrate 6 and second substrate 7 are provided with a plurality of sets each of which includes two adjacent electrodes 16. An interval is provided in a portion of substrate wiring patterns 6P and 7P, and each set of two adjacent electrodes 16 close electric circuits of substrate wiring patterns 6P and 7P when conductive film 10b is pressed by each set of electrodes 16 and open the electric circuits of substrate wiring patterns 6P and 7P when conductive film 10b is separated from electrodes 16. With the above-mentioned configuration, tamper detection circuit 20 built into electronic component 8 can detect the release of blocking of secure region S through the separation of first substrate 6 or second substrate 7 from frame member 9. Meanwhile, folded portion 12a is not essential as long as substrate connection circuit 12 is accommodated in a protection region.

Flexible substrate 11 covering the outside of wall surface portion 13 is mounted to wall surface portion 13 of frame member 9. Flexible substrate 11 is provided with wiring pattern 11a having a snake shape and connection tab 11b extending from a main portion of flexible substrate 11. Connection tab 11b is fitted to third connector 6b provided on first substrate 6 and is electrically connected to electronic component 8.

Flexible substrate 11 is a so-called flexible printed circuit board in which a circuit is formed in a film-shaped sheet such as polyethylene terephthalate which is bendable. The wiring pattern is formed only on the side of flexible substrate 11 which faces a frame member 9 side, and the surface thereof is colored in black so that wiring pattern 11*a* is difficult to see from the outside. For example, the coloring in black is performed by coating the wiring pattern with a black or dark resin material (for example, black PET or the like) or by attaching a black film or the like to the wiring pattern.

Snake-shaped wiring pattern 11*a* provided in flexible substrate 11 is a tamper detection line. The term "tamper" used herein refers to fraudulent analysis or alteration of software within an information processing apparatus or hardware, or fraudulent deprivation or alteration of information within an information processing apparatus or an attack disabling the use of the information.

Figure 5A:
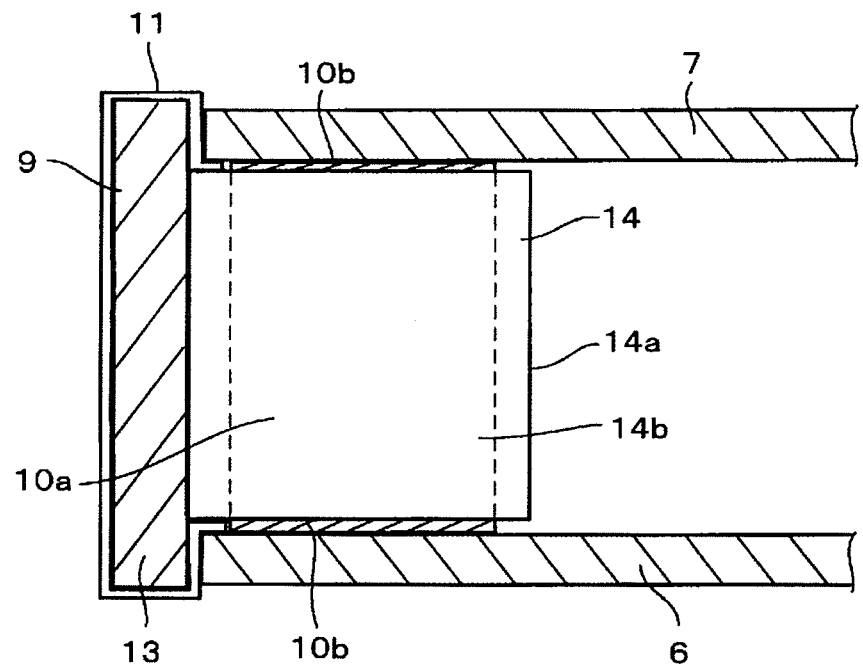
FIG. 5A is a cross-sectional view taken along line A-A of FIG. 4.
Figure 5B:
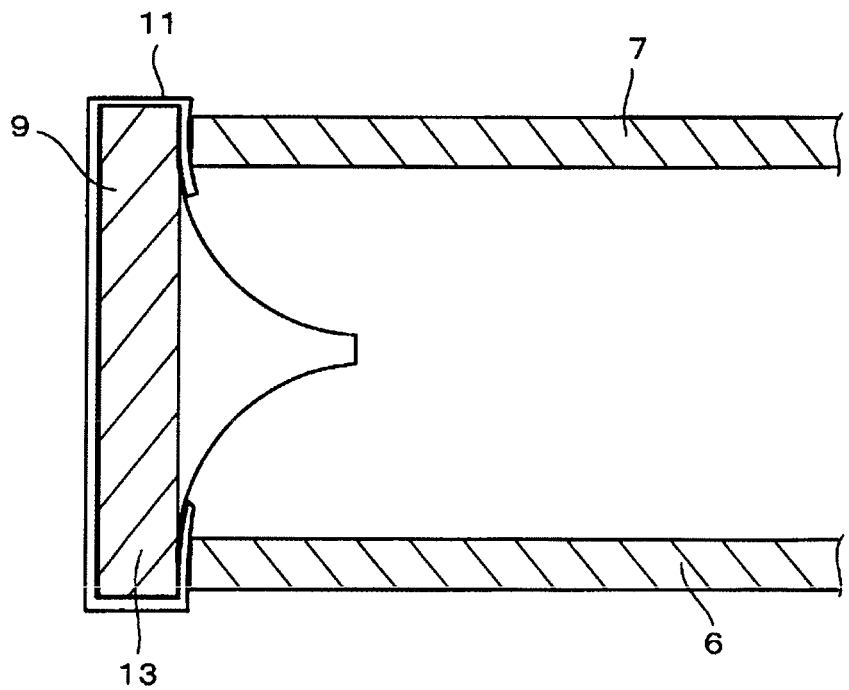
FIG. 5B is a cross-sectional view taken along line B-B of FIG. 4.

FIG. 5A is a cross-sectional view taken along line A-A of FIG. 4, and FIG. 5B is a cross-sectional view taken along line B-B of FIG. 4. In addition, the cross-sectional views illustrate a cross-section after an assembling state of secure region S. In FIGS. 5A and 5B, electrode 16 is omitted.

First substrate 6 and second substrate 7 are fitted to frame member 9 from above and below, respectively, and conductive member 10 and flexible substrate 11 are fixed to predetermined locations. First substrate 6, second substrate 7, and frame member 9 are fixed by a method such as, for example, an adhesive, welding, molding, or screwing. Conductive member 10 is inserted into opening 14*b* of elastic member mounting portion 14, and is fixed in a state where both ends thereof are pressed by first substrate 6 and second substrate 7. With the above-mentioned simple configuration, the assembling property of settlement processing apparatus 1 is improved.

Flexible substrate 11 covers the entire circumference of wall surface portion 13 of frame member 9 and is rolled from the upper and lower sides of wall surface portion 13 to thereby cover at least a portion of the inside of wall surface portion 13. When first substrate 6 and second substrate 7 are fitted to frame member 9, first substrate 6 and second substrate 7 bring the tip portion of flexible substrate 11 which is rolled from the upper and lower sides of wall surface portion 13 into close contact with the inside of wall surface portion 13.

As described above, in settlement processing apparatus 1 according to the present disclosure, secure region S provided with electronic component 8 having a memory storing protection information built therein is formed within the module constituted by first substrate 6, second substrate 7, and frame member 9. Since secure region S is electrically connected even when first substrate 6 and second substrate 7 are separated from frame member 9, a circuit component can be freely disposed between first substrate 6 and second substrate 7. Flexible substrate 11 having wiring pattern 11*a*, which is a tamper detection line, formed therein covers the entire outer circumference of wall surface portion 13 of frame member 9 and covers the upper and lower sides of wall surface portion 13, and thus safety against a physical fraudulent action is improved. Wiring pattern 11*a* of flexible substrate 11 is electrically connected to electronic component 8 and detects a physical fraudulent action from the side portion of the module constituting secure region S, and thus it is possible to make information within secure region S unreadable and to erase the information.

Here, secure region S can be formed into a module without including an non-secure region (see FIG. 11) other than secure region S within settlement processing apparatus 1, and thus the circuit of secure region S is disposed so as to have an optimal shape without being influenced by the circuit arrangement of the non-secure region. The module constituting secure region S can be disposed in a place different from a place where a substrate constituting the non-secure region is disposed, within housing 2. Accordingly, it is possible to perform designing of setting secure region S at an optimal location in settlement processing apparatus 1 as a whole.

In this exemplary embodiment, the external forms of first substrate 6 and second substrate 7 when seen in a plan view are smaller than the external forms of the frame member when seen in a plan view. According to such a configuration, it is possible to maximally utilize the surface on which first substrate 6 and second substrate 7 are mounted, in arranging the circuit within secure region S.

FIG. 6 is a schematic diagram illustrating an example of a first exemplary embodiment of a secure region.

Electronic component 8 mounted on first substrate 6 includes a memory built-in central processing unit (CPU) 21 including tamper detection circuit 20 constituting a portion of electronic component 8, a memory storing information to be protected, and a control circuit. That is, electronic component 8 has a function of detecting tampering and is also a target to be protected. In addition, first substrate 6 and second substrate 7 are provided with a plurality of sets each of which includes two electrodes 16. The electrodes are electrically connected to either one of substrate wiring patterns 6P and 7P which are respectively mounted on first substrate 6 and second substrate 7, and are provided adjacent to each other.

Each set of two adjacent electrodes 16 has an interval in a portion of substrate wiring patterns 6P and 7P. Conductive member 10 fixed between first substrate 6 and second substrate 7 includes elastic member 10*a* and conductive film 10*b*. Conductive film 10*b* is formed on both surfaces or one surface of elastic member 10*a*. Conductive film 10*b* is pressed by the set of two adjacent electrodes 16 by an elastic force of elastic member 10*a* and electrically connects the two adjacent electrodes 16. First substrate 6 and second substrate 7 are not electrically connected to each other through conductive member 10. Conductive member 10 functions as an electrode connection member that electrically connects two electrodes 16 provided adjacent to each other by conductive film 10*b*, and is used to maintain the electrical connection of substrate wiring pattern 6P of first substrate 6 or second substrate wiring pattern 7P. When either first substrate 6 or second substrate 7 is fraudulently removed, conductive film 10*b* of conductive member 10 and the set of two adjacent electrodes 16 connected to each other by conductive film 10*b* are separated, and the electrical connection of substrate wiring pattern 6P or 7P is opened. However, even when the first substrate or the second substrate is separated from the frame member, the electrical connection between the first substrate and the second substrate is maintained. Accordingly, tamper detection circuit 20 can detect that the substrate on the side on which tamper detection circuit 20 is not mounted is separated from the frame member, and thus can detect the release of blocking of the secure region. With the above-mentioned configuration, it is possible to detect a destructing action of secure region S, and the like, to make confidential information within the secure region unreadable, and to erase the confidential information.

FIG. 7 is a wiring diagram illustrating the electrical connection of the wiring pattern of the first exemplary embodiment.

Substrate wiring pattern 6P is formed as a snake-shaped wiring pattern in first substrate 6, and substrate wiring pattern 7P is formed as a snake-shaped wiring pattern in second substrate 7. The wiring patterns functions as tamper detection patterns (tamper detection lines). That is, substrate wiring pattern 6P functions as a first tamper detection pattern, and substrate wiring pattern 7P functions as a second tamper detection pattern. Substrate wiring pattern 6P of first substrate 6 and substrate wiring pattern 7P of second substrate 7 are electrically connected through substrate connection circuit 12. In addition, flexible substrate 11 is electrically connected to tamper detection circuit 20 through connection tab 11b and third connector 6b, independently of substrate wiring pattern 6P and substrate wiring pattern 7P.

In this exemplary embodiment, a set of two adjacent electrodes 16 mounted on first substrate 6 or second substrate 7 is provided at two locations. Each set of two adjacent electrodes 16 is electrically connected to the other through conductive film 10b, and thus substrate wiring patterns 6P and 7P are set to be in an electrical conduction state. Substrate wiring pattern 6P of first substrate 6 is directly and electrically connected to tamper detection circuit 20 mounted on first substrate 6, and substrate wiring pattern 7P of second substrate 7 is electrically connected to tamper detection circuit 20 through substrate connection circuit 12.

As fraudulent access to secure region S, first substrate 6 or second substrate 7 may be separated from frame member 9, or a portion of wiring pattern 11a of flexible substrate 11 may be cut off or may be short-circuited to another signal, a power supply, or a ground. Further, a portion of substrate wiring pattern 6P or 7P of first substrate 6 or second substrate 7 may also be cut off or short-circuited. When the fraudulent access to electronic component 8 of secure region S occurs, wiring pattern 11a and substrate wiring patterns 6P and 7P are electrically cut off (opened) or short-circuited, and it is determined whether or not tamper detection circuit 20 has detected a physical fraudulent action. Thus, stored information to be protected is set to be unreadable or erased.

Particularly, in the configuration of this exemplary embodiment, wiring pattern 11a of flexible substrate 11 is directly and electrically connected to tamper detection circuit 20 (built into electronic component 8) without passing through a substrate (second substrate 7 in FIGS. 4, 6, and 7) on which tamper detection circuit 20 is not mounted. Therefore, even when any problem occurs in a tamper detection pattern (substrate wiring patterns 6P and 7P) for detecting the separation of first substrate 6 or second substrate 7 from frame member 9, it is possible to detect a physical fraudulent action from the side portion of the module constituting secure region S without being influenced by the problem. Accordingly, it is possible to make information stored in the memory within secure region S unread or to erase the information.

When tamper detection circuit 20 determines that destruction has occurred, the tamper detection circuit transmits the information thereof to memory built-in CPU 21. For example, memory built-in CPU 21 performs predetermined encryption for erasing information to be protected or for concealing information to be protected so as not to be accessed.

In settlement processing apparatus 1 according to this exemplary embodiment, substrate connection circuit 12 is provided in order to electrically connect first substrate 6 and second substrate 7. As this will be described later, with such a configuration, the degree of freedom of the layout of a memory storing information to be protected, tamper detection circuit 20, and a control unit (CPU or the like) that controls the memory and the tamper detection circuit is increased. Therefore, in settlement processing apparatus 1 according to this exemplary embodiment, it is possible to reduce the size of secure region S while achieving a simple structure and easy assembling. In addition, in this exemplary embodiment, since conductive film 10b of conductive member 10 is electrically connected to two electrodes 16, any one of substrate wiring patterns 6P and 7P is cut off (opened) even when either first substrate 6 or second substrate 7 is removed, and thus it is possible to detect destruction. Meanwhile, with a configuration in which tamper detection circuit 20 is mounted on both first substrate 6 and second substrate 7, substrate connection circuit 12 is not always necessary as long as the physical fraudulent action can be detected.

In this exemplary embodiment, division is performed into two substrates of first substrate 6 and second substrate 7, a circuit requiring security for secure region S is configured in each of first and second substrates 6 and 7, and the vicinity of frame member 9 is covered by flexible substrate 11 for detecting a fraudulent action and the like. Tamper detection circuit 20 detecting destruction and memory built-in CPU 21 storing secret information are mounted on a substrate (first substrate 6 or second substrate 7) so as to have at least an area equal to or smaller than that of frame member 9. With the above-mentioned configuration, it is possible to secure a reduction in the size and easy assembling of settlement processing apparatus 1. In addition, a circuit having a snake-shaped wiring pattern may be formed in wall surface portion 13 through, for example, etching, bonding, metal deposition, printing, or plating, instead of flexible substrate 11.

Figure 8:
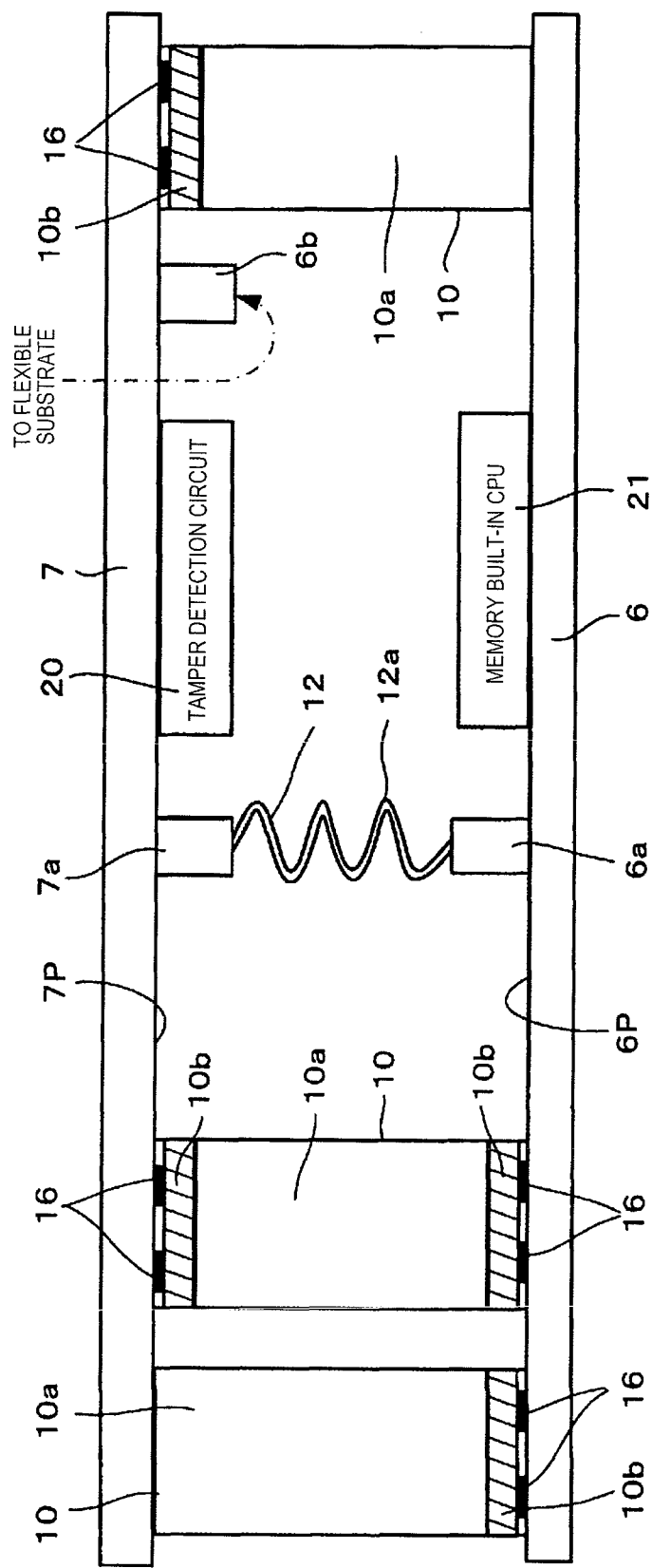
FIG. 8 is a schematic diagram illustrating an example of a second exemplary embodiment of the secure region of the settlement processing apparatus according to the present disclosure.

FIG. 8 is a schematic diagram illustrating an example of a second exemplary embodiment of a secure region.

In the first exemplary embodiment, tamper detection circuit 20 and memory built-in CPU 21 are mounted on first substrate 6. However, in the second exemplary embodiment, memory built-in CPU 21 is mounted on first substrate 6, and tamper detection circuit 20 is mounted on second substrate 7. In the first exemplary embodiment, third connector 6b is provided on first substrate 6. However, in the second exemplary embodiment, a third connector is provided on a second substrate 7 side.

Figure 9:
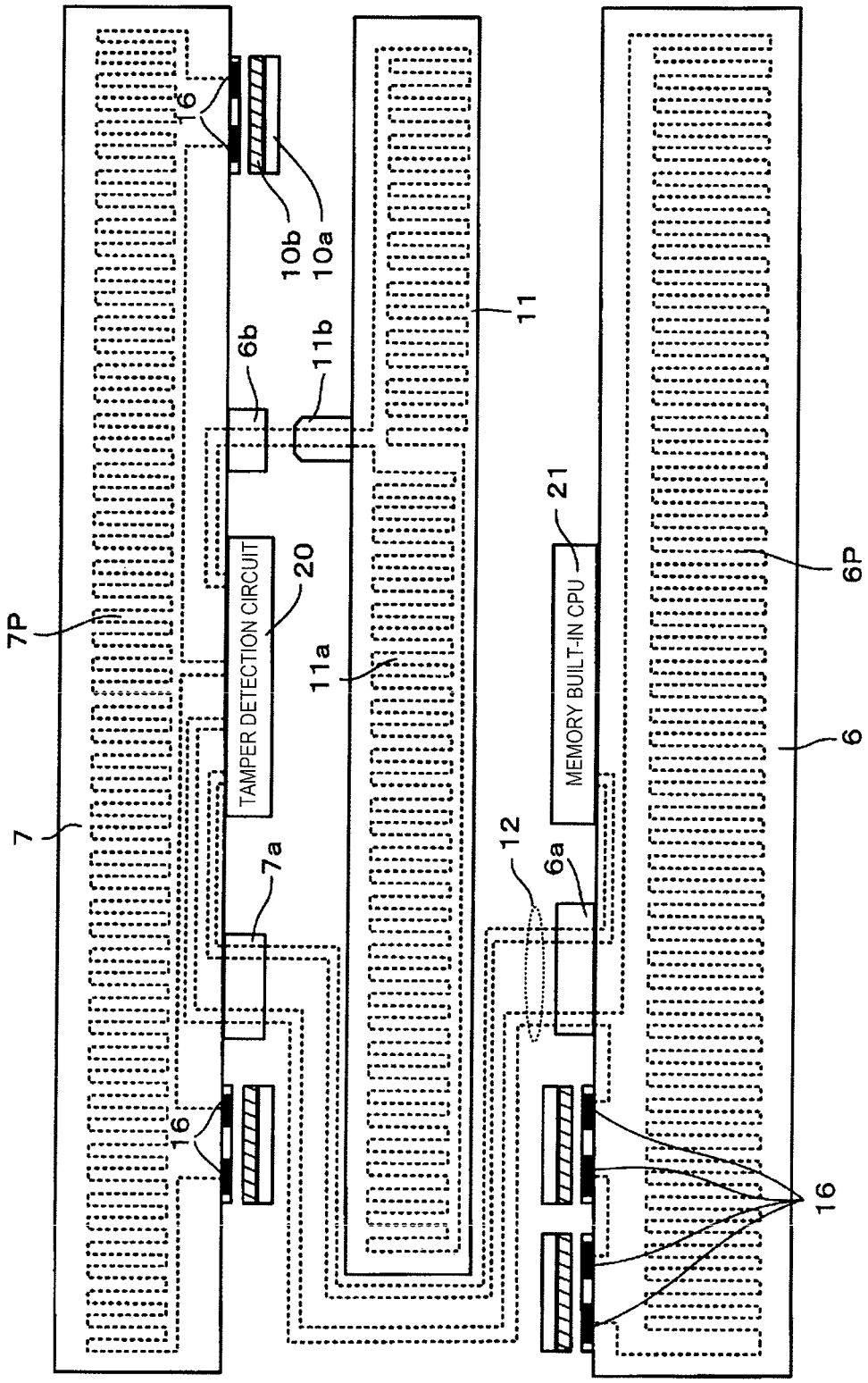
FIG. 9 is a wiring diagram illustrating electrical connection of a wiring pattern of the second exemplary embodiment.
Figure 10B:
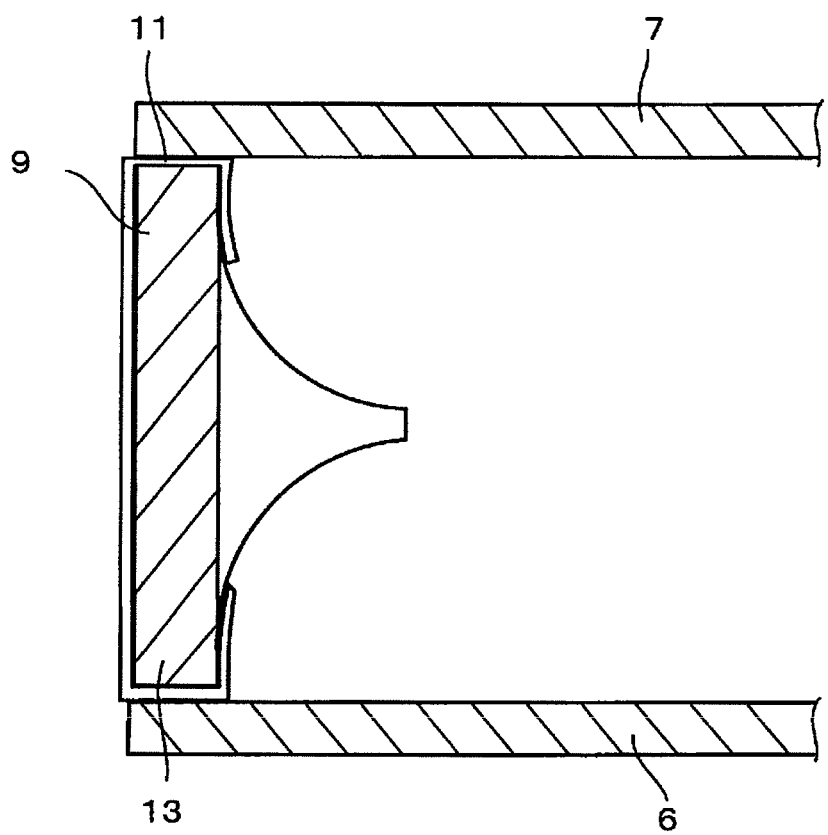

FIG. 9 is a wiring diagram illustrating electrical connection of a wiring pattern of the second exemplary embodiment.

The arrangement of two electrodes 16 mounted on first substrate 6 and second substrate 7 is the same as that in the first exemplary embodiment. Flexible substrate 11 is electrically connected to tamper detection circuit 20 independently mounted on second substrate 7, through connection tab 11b and third connector 6b. Substrate wiring pattern 6P of first substrate 6 is electrically connected to tamper detection circuit 20 through substrate connection circuit 12, and substrate wiring pattern 7P of second substrate 7 is directly and electrically connected to tamper detection circuit 20 mounted on second substrate 7.

A pair of wirings is provided in substrate connection circuit 12 according to the first exemplary embodiment. However, in the second exemplary embodiment, a wiring electrically connecting tamper detection circuit 20 and memory built-in CPU 21 is added. Tamper detection circuit 20 and memory built-in CPU 21 are disposed on the respective substrates (first substrate 6 and second substrate 7), and thus the degree of freedom of the layouts of tamper detection circuit 20 and the like are improved, while allows the size of secure region S to be reduced. That is, instead of mounting electronic component 8 storing information to be protected on only one substrate, electronic components are respectively disposed on two substrates, and thus the area of the substrate is reduced. Accordingly, it is possible to further facilitate a reduction in the size of the substrate and to provide settlement processing apparatus 1 with high tamper resistance which is capable of easily finding a physical fraudulent action.

Electronic component 8 storing information to be protected which is recorded in secure region S is surrounded by first substrate 6, second substrate 7, and frame member 9, and frame member 9 is covered by flexible substrate 11, and thus wiring pattern 11a of flexible substrate 11 and electronic component 8 are electrically connected to each other. For example, when a portion of wiring pattern 11a of flexible substrate 11 is cut off or short-circuited due to an attempt to make fraudulent contact with electronic component 8, information to be protected which is stored in electronic component 8 is erased or unreadable.

On the other hand, not only the outside of wall surface portion 13 of frame member 9 but also the inside of wall surface portion 13 is covered by flexible substrate 11 by rolling the upper and lower sides of wall surface portion 13. For example, even when there is an attempt to make a fraudulent contact with electronic component 8 by inserting a cutting tool between first substrate 6 or second substrate 7 and frame member 9, wiring pattern 11a of flexible substrate 11 is cut off or short-circuited, and information to be protected which is stored in electronic component 8 is made to be unreadable. In this manner, it is possible to improve safety against an attack attempting to make a fraudulent contact with electronic component 8.

In this exemplary embodiment, since flexible substrate 11 is coated with a black resin material, it is difficult to view wiring pattern 11a provided in flexible substrate 11 from the outside. Therefore, it is possible to improve safety against an attack inserting a cutting tool into wiring pattern 11a.

Although a state where flexible substrate 11 is assembled to wall surface portion 13 of frame member 9 has been described with reference to FIGS. 5A and 5B, FIGS. 10A and 10B are other exemplary embodiments. Similarly to FIGS. 5A and 5B, electrode 16 is omitted in FIGS. 10A and 10B.

In the examples illustrated in FIGS. 5A and 5B, the external forms of first substrate 6 and second substrate 7 when seen in a plan view are smaller than the external form of frame member 9 when seen in a plan view. In the examples illustrated in FIGS. 10A and 10B, the external forms of first substrate 6 and second substrate 7 when seen in a plan view are substantially the same as the external form of frame member 9 when seen in a plan view. That is, first substrate 6 and second substrate 7 are fixed to the upper and lower surfaces of wall surface portion 13 of frame member 9 through flexible substrate 11 with frame member 9 interposed therebetween. A method of fixing conductive member 10 and flexible substrate 11 is the same as that in the examples illustrated in FIGS. 5A and 5B.

Figure 11:
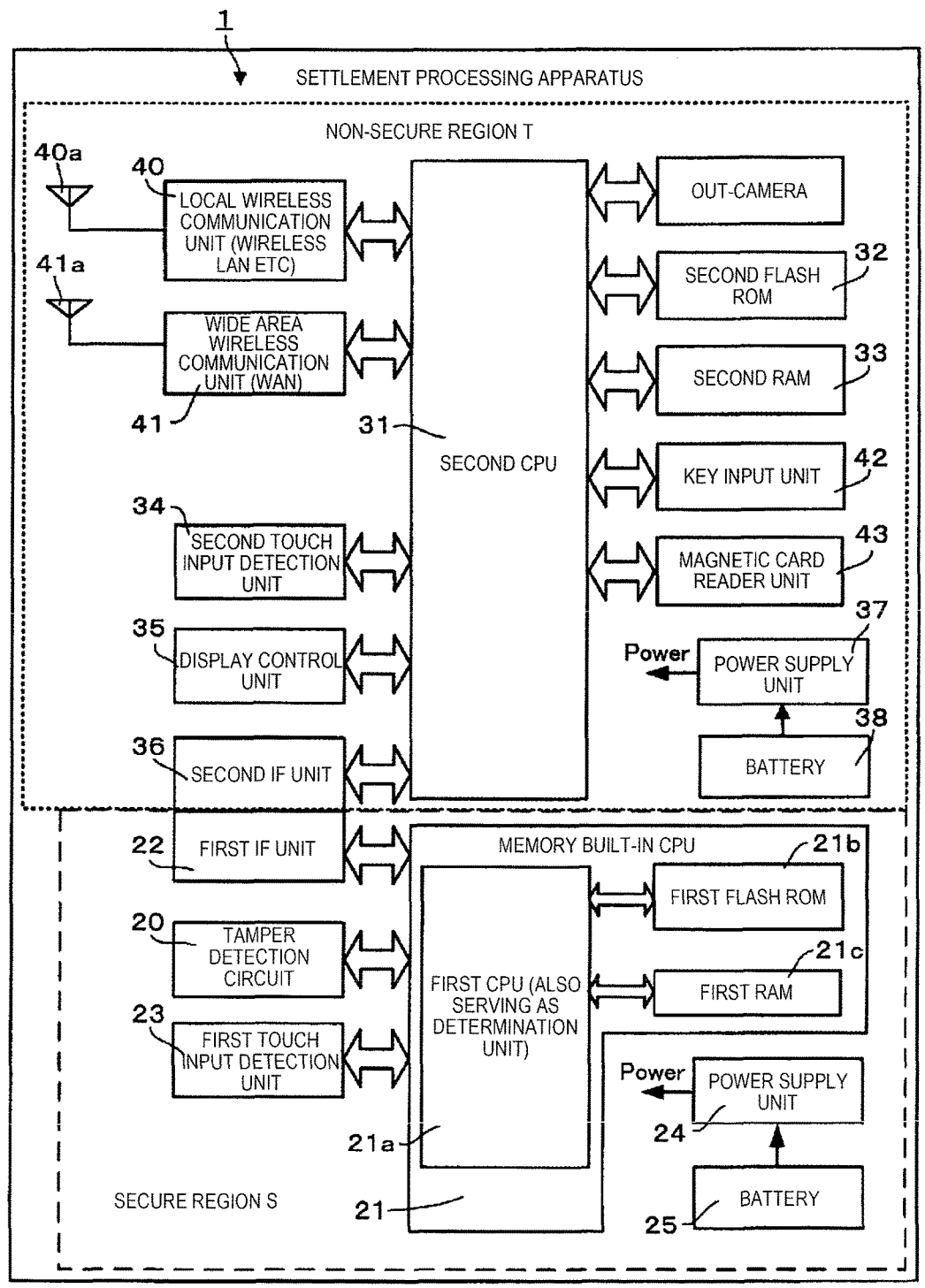
FIG. 11 is a block diagram illustrating an example of the configuration of the settlement processing apparatus according to the present disclosure.

An example of the configuration of settlement processing apparatus 1 will be described below with reference to a block diagram of FIG. 11.

Settlement processing apparatus 1, which is a portable type, includes secure region S and non-secure region T. A term "secure" means having tamper resistance. A term "non-secure" means not having tamper resistance. For example, it is possible to protect customer information in a settlement process and to safely perform settlement by having tamper resistance. In addition, it has been described that operation unit 4 is provided with secure region S, but the exemplary embodiment is not particularly limited.

Secure region S is provided with first interface (IF) unit 22, first touch input detection unit 23, power supply unit 24, and battery 25, in addition to tamper detection circuit 20 and memory built-in CPU 21 mentioned above. In addition, memory built-in CPU 21 includes first CPU 21a, first flash read only memory (ROM) 21b, and first random access memory (RAM) 21c.

In secure region S, various types of components are electrically and logically connected to first CPU 21a. First CPU 21a controls all of the components in secure region S. For example, first CPU 21a executes a program stored in first flash ROM 21b to thereby perform various types of control, processing, setting, determination, decision, confirmation, authentication, collation (for example, collation of a PIN and a signature).

First flash ROM 21b has a function of storing personal information such as an encryption key and a PIN used for communication with a settlement center, other pieces of confidential information such as settlement information related to settlement, a program for settlement processing apparatus 1 to receive a PIN input and perform collation for settlement, and the like. First flash ROM 21b is an example of a storage medium that stores an information processing program.

First RAM 21c is a memory which is used to temporarily store processing data generated in the middle of a computation process, for example, when the computation process associated with the reception and collation of a PIN input for settlement of settlement processing apparatus 1 (for example, secure region S) is performed.

Tamper detection circuit 20 monitors secure region S and detects intrusion into secure region S, for example, disassembling, destruction, or opening. In other words, tamper detection circuit 20 detects the presence or absence of an abnormality in secure region S. When the above-mentioned phenomenon is detected by tamper detection circuit 20, the settlement process may be stopped, or the presence of a physical abnormality in secure region S may be reported using input and display unit 3 or the like.

First touch input detection unit 23 has a function of detecting a touch input to input and display unit 3. For example, first touch input detection unit 23 may detect an input to a pin pad which is a physical keypad or software keypad for inputting a PIN. First touch input detection unit 23 may detect a signature input using, for example, a finger or a stylus pen. First touch input detection unit 23 may detect a PIN input performed by handwriting using, for example, a finger or a stylus pen. First touch input detection unit 23 is an example of an input detection unit.

Power supply unit 24, which is a power supply of secure region S, receives power supplied from battery 25 and supplies power to secure region S (for example, first CPU 21a). First CPU 21a can supply power or stop supplying power to some or all of the circuits disposed in secure region S by controlling power supply unit 24.

Non-secure region T includes second CPU 31, second flash ROM 32, second RAM 33, second touch input detection unit 34, display control unit 35, second IF unit 36, power supply unit 37, and battery 38. Further, non-secure region T includes local wireless communication unit 40, wide area wireless communication unit 41, key input unit 42, and magnetic card reader unit 43.

In non-secure region T, various types of components are electrically and logically connected to second CPU 31. Second CPU 31 controls all of the components in non-secure region T. For example, second CPU 31 executes a program stored in second flash ROM 32 to thereby perform various types of control, processing, setting, determination, and the like.

Second flash ROM 32 has a function of storing various types of data. The stored data may be a business application program or data regarding business affairs, or may be a program for controlling settlement processing apparatus 1 (for example, non-secure region T). Accordingly, second flash ROM 32 is an example of a storage medium that stores an information processing program.

Second RAM 33 is a memory which is used to temporarily store processing data generated in the middle of a computation process, for example, when the computation process associated with the operation of settlement processing apparatus 1 (for example, a component in non-secure region T) is performed.

Second touch input detection unit 34 has a function of detecting a touch input to input and display unit 3. Display control unit 35 has a function of controlling the display of input and display unit 3.

Secure region S and non-secure region T are connected to each other through first IF unit 22 and second IF unit 36 provided in non-secure region T, and transmit and receive various types of data and commands to and from each other. First IF unit 22 and second IF unit 36 can be coupled to each other.

Power supply unit 37, which is a power supply of non-secure region T, receives power from battery 38 and supplies power to non-secure region T (for example, second CPU 31). Second CPU 31 can supply power or stop supplying power to some or all of the circuits disposed in non-secure region T by controlling power supply unit 37.

Local wireless communication unit 40, which is connected to local wireless communication antenna 40a, has a function of performing, for example, wireless LAN communication using a local wireless communication path not shown in the drawing. Local wireless communication unit 40 may perform communication (for example, Bluetooth (registered trademark) communication) other than wireless LAN communication.

Wide area wireless communication unit 41, which is connected to wide area wireless communication antenna 41a, has a function of performing communication through a wide area wireless communication path (for example, a wide area network (WAN)) which is not shown in the drawing. The communication in the wide area wireless communication path may be performed, for example, through a radio telephone line (mobile phone line such as wideband code division multiple access (W-CDMA), code division multiple access (CDMA) 2000, or long term evolution (LTE)).

For example, key input unit 42 has a function of receiving an input from keyboard unit 5 which is disposed in an non-secure region. Magnetic card reader unit 43 has a function of reading a magnetic stripe of a magnetic card.

In this manner, settlement processing apparatus 1 includes secure region S and non-secure region T. A "secure" portion requiring "tamper resistance" is localized in secure region S.

On the other hand, for example, a large number of information terminals (for example, smartphones and tablet terminals) which are being distributed for customer use and a part of them may be adopted for non-secure region T as platforms.

A general-purpose platform is adopted in non-secure region T, and thus the reuse and recycling of development assets of application software for settlement (settlement application) and application software used for other business affairs (business application) are facilitated. The settlement application and other business applications are processed by, for example, second CPU 31 in non-secure region T which has a high computation processing ability, and thus are flexibly operated without stress. It is possible to easily use various business applications and settlement processes having various settlement schemes and to load them into the settlement processing apparatus in a short period of time.

Substrates fixed to frame member 9 are described as first substrate 6 and second substrate 7, but do not need to be limited to "first" and "second" substrates. For example, electronic component 8 may be provided on second substrate 7. Alternatively, electronic component 8 may be divided into two components, and the two components may be provided on the respective substrates.

The information processing apparatus of the present disclosure includes a first substrate, a second substrate which is provided so as to face the first substrate, a frame member which supports the first substrate and the second substrate on the inner surface side of a wall surface portion surrounding the external forms of the first substrate and the second substrate, and a tamper detection circuit which is disposed within a secure region surrounded by the first substrate, the second substrate, and the frame member and detects the release of blocking of the secure region.

In addition, the information processing apparatus of the present disclosure includes a first substrate, a second substrate which is provided so as to face the first substrate, a frame member which has a wall surface portion surrounding the external forms of the first substrate and the second substrate and in which a through hole is defined on the inner side of wall surface portion and the first substrate and the second substrate are disposed in the through hole, and a tamper detection circuit which is disposed within a secure region surrounded by the first substrate, the second substrate, and the frame member and detects the release of blocking of the secure region.

In addition, the information processing apparatus of the present disclosure includes a first substrate, a second substrate which is provided so as to face the first substrate, a frame member which has a wall surface portion surrounding the external forms of the first substrate and the second substrate and supports the first substrate and the second substrate on the inner surface side of the wall surface portion, a tamper detection circuit which is disposed within a secure region surrounded by the first substrate, the second substrate, and the frame member and detects the release of blocking of the secure region, and a flexible substrate which covers the entire outer circumference of the wall surface portion and a connection end face between the outside of the wall surface portion and the inner surface side and includes a wiring pattern electrically connected to the tamper detection circuit. One end on the side of the long side of the flexible substrate is disposed between the inner surface of the wall surface portion and the outer end face of the first substrate and within the secure region, and the other end on the side of the long side of the flexible substrate is disposed between the inner surface of the wall surface portion and the outer end face of the second substrate and within the secure region.

In addition, the information processing apparatus of the present disclosure includes a first substrate, a second substrate which is provided so as to face the first substrate, a frame member which has a wall surface portion surrounding the external forms of the first substrate and the second substrate and in which a through hole is defined on the inner side of the wall surface portion and the first substrate and the second substrate are disposed in the through hole, a tamper detection circuit which is disposed in a secure region interposed between the first substrate and the second substrate in the through hole and detects the release of blocking of the secure region, and a flexible substrate which covers the entire outer circumference of the wall surface portion and a connection end face between the outside of the wall surface portion and the inner side and includes a wiring pattern electrically connected to the tamper detection circuit. One end on the side of the long side of the flexible substrate is disposed between the inner surface of the wall surface portion and the outer end face of the first substrate and within the secure region, and the other end on the side of the long side of the flexible substrate is disposed between the inner surface of the wall surface portion and the outer end face of the second substrate and within the secure region.

With the above-mentioned configuration, the secure region can be formed into a module without including an non-secure region other than the secure region within the information processing apparatus, and thus the circuit of the secure region is disposed so as to have an optimal shape without being influenced by the circuit arrangement of the non-secure region. The module constituting the secure region can be disposed in a place different from a place where a substrate constituting the non-secure region is disposed, within a housing of the information processing apparatus. Accordingly, it is possible to perform designing of setting the secure region at an optimal location in the information processing apparatus as a whole.

As an aspect of the information processing apparatus of the present disclosure, for example, the external forms of the first substrate and the second substrate when seen in a plan view are smaller than the external form of the frame member when seen in a plan view.

As an aspect of the information processing apparatus of the present disclosure, for example, an elastic member mounting portion which is integrally formed with the wall surface portion and has an elastic member mounted thereto is formed on the inner surface side of the wall surface portion. The elastic member mounting portion is constituted by a wall portion that secures a space where the elastic member is mounted, and the upper and lower surfaces of the wall portion support the first substrate and the second substrate.

As an aspect of the information processing apparatus of the present disclosure, for example, a flexible substrate including a wiring pattern electrically connected to the tamper detection circuit is provided so as to cover at least the entire outer circumference of the wall surface portion.

As an aspect of the information processing apparatus of the present disclosure, for example, further provided are a first tamper detection pattern provided in the first substrate and electrically connected to the tamper detection circuit and a second tamper detection pattern provided in the second substrate and electrically connected to the tamper detection circuit. A wiring pattern of the flexible substrate is electrically connected to the tamper detection circuit independently of the first tamper detection pattern and the second tamper detection pattern.

As an aspect of the information processing apparatus of the present disclosure, for example, further provided is an electronic component mounted on the surface of one of the first substrate and the second substrate which faces the other substrate and serving as a target to be protected which stores information to be protected.

In addition, the settlement processing apparatus of the present disclosure includes a first substrate, a second substrate which is provided so as to face the first substrate, a frame member which includes a wall surface portion surrounding a secure region together with the first substrate and the second substrate, a tamper detection circuit which is disposed within the secure region and detects the release of blocking of the secure region, and a substrate connection circuit which electrically connects the first substrate and the second substrate so as to cross the secure region.

In addition, the settlement processing apparatus of the present disclosure includes a first substrate, a second substrate which is provided so as to face the first substrate, a frame member which includes a wall surface portion surrounding a secure region together with the first substrate and the second substrate, a tamper detection circuit which is disposed within the secure region and detects the release of blocking of the secure region, and a substrate connection circuit which electrically connects the first substrate and the second substrate so as to cross the secure region and has a length larger than a distance between the first substrate and the second substrate.

As an aspect of the settlement processing apparatus of the present disclosure, for example, further provided are a first tamper detection pattern provided in the first substrate and electrically connected to the tamper detection circuit, a second tamper detection pattern provided in the second substrate and electrically connected to the tamper detection circuit, two electrodes which are provided so as to open an electric circuit of the first tamper detection pattern or the second tamper detection pattern, and an electrode connection member which is provided independently of the first substrate and the second substrate and electrically connects the two electrodes.

As an aspect of the settlement processing apparatus of the present disclosure, for example, the electrode connection member is disposed between the first substrate and the second substrate.

As an aspect of the settlement processing apparatus of the present disclosure, for example, the electrode connection member includes an elastic member disposed between the first substrate and the second substrate, and a conductive film formed on the surface of the elastic member. The elastic member is fixed between the first substrate and the second substrate by an elastic force of the elastic member, and the conductive film is pressed by the two electrodes to thereby secure electrical connection between the two electrodes.

As an aspect of the settlement processing apparatus of the present disclosure, for example, a flexible substrate including a wiring pattern electrically connected to the tamper detection circuit is provided so as to cover at least the entire outer circumference of the wall surface portion.

As an aspect of the settlement processing apparatus of the present disclosure, for example, the wiring pattern of the flexible substrate is electrically connected to the tamper detection circuit independently of the first tamper detection pattern and the second tamper detection pattern.

As an aspect of the settlement processing apparatus of the present disclosure, for example, the substrate connection circuit has a length larger than a distance between the first substrate and the second substrate.

As an aspect of the settlement processing apparatus of the present disclosure, for example, the substrate connection circuit is constituted by a flexible foldable substrate having a folded portion.

As an aspect of the settlement processing apparatus of the present disclosure, for example, further provided is an electronic component mounted on the surface of one of the first substrate and the second substrate which faces the other substrate and serving as a target to be protected which stores information to be protected.

The present disclosure is not limited to the above-mentioned exemplary embodiment, and appropriate modification, improvement, and the like can be made. In addition, the material, shape, dimension, numerical value, mode, number, arrangement location, and the like of each component in the above-mentioned exemplary embodiment are arbitrary and are not limited as long as the present disclosure can be implemented.

What is claimed is:

1. An information processing apparatus, comprising:
a first substrate;
a second substrate which faces the first substrate;
a frame member which includes a wall surface portion surrounding a secure region together with the first substrate and the second substrate;
a tamper detection circuit which is disposed within the secure region and detects release of blocking of the secure region; and
a substrate connection circuit which electrically connects a first surface that is a first side of the secure region of the first substrate and a second surface that is a second side of the secure region of the second substrate,
when the frame member contacts the first substrate and the second substrate, a length of a portion of the substrate connection circuit which crosses the secure region is greater than a distance between the first substrate and the second substrate, and
in a plan view perpendicular to the first substrate and the second substrate, peripheries of the first substrate and the second substrate are each smaller than and within a periphery of the frame member.

2. The information processing apparatus of claim 1, further comprising:
a first tamper detection pattern which is in the first substrate and is electrically connected to the tamper detection circuit;
a second tamper detection pattern which is in the second substrate and is electrically connected to the tamper detection circuit;
two electrodes which open an electric circuit of the first tamper detection pattern or the second tamper detection pattern; and
an electrode connection member which is independent of the first substrate and the second substrate and electrically connects the two electrodes.

3. The information processing apparatus of claim 2, wherein the electrode connection member is disposed between the first substrate and the second substrate.

4. The information processing apparatus of claim 3,
wherein the electrode connection member includes an elastic member disposed between the first substrate and the second substrate, a conductive film being formed on a surface of the elastic member, and
the elastic member is fixed between the first substrate and the second substrate by an elastic force of the elastic member, the conductive film being pressed by the two electrodes to thereby secure electrical connection between the two electrodes.

5. The information processing apparatus of claim 2, wherein a flexible substrate including a wiring pattern electrically connected to the tamper detection circuit covers at least the entire outer circumference of the wall surface portion.

6. The information processing apparatus of claim 5, wherein the wiring pattern of the flexible substrate is electrically connected to the tamper detection circuit independently of the first tamper detection pattern and the second tamper detection pattern.

7. The information processing apparatus of claim 1, wherein the substrate connection circuit is constituted by a flexible foldable substrate having a folded portion.

8. The information processing apparatus of claim 1, further comprising:
an electronic component mounted on one of the first surface of the first substrate and the second surface of the second substrate which is a target to be protected and stores information to be protected.

9. The information processing apparatus of claim 1, further comprising:
a first connector which is disposed on the first side of the secure region of the first substrate and which is connected to one end of the substrate connection circuit; and
a second connector which is disposed on the second side of the secure region of the second substrate and which is connected to another end of the substrate connection circuit opposite to the one end of the substrate connection circuit.

10. The information processing apparatus of claim 1, wherein the substrate connection circuit is a flexible circuit.

11. The information processing apparatus of claim 1, wherein the tamper detection circuit detects the release of the blocking of the secure region through separation of one of the first substrate and the second substrate from the frame member.

12. The information processing apparatus of claim 11, wherein the frame member has a shape that is closed in a circumferential direction by the wall surface portion.

13. The information processing apparatus of claim 12, wherein the frame member includes at least one member mounting portion, the member mounting portion being integral with the frame member and defining an opening, the opening being open to the first surface that is the first side of the secure region of the first substrate and the second surface that is the second side of the secure region of the second substrate.

14. The information processing apparatus of claim 13, wherein the member mounting portion has a shape that is closed in the circumferential direction.

15. The information processing apparatus of claim 14, further comprising:
a conductive member mounted in the member mounting portion, the tamper detection circuit detecting the separation of one of the first substrate and the second substrate from the frame member via the conductive member.

16. The information processing apparatus of claim 1, wherein the substrate connection circuit is a flexible foldable substrate having a plurality of folds.

17. The information processing apparatus of claim 16, wherein the substrate connection circuit is connected to the first surface that is the first side of the secure region of the first substrate via a first connector disposed on the first substrate,
the substrate connection circuit is connected to the second surface that is the second side of the secure region of the second substrate via a second connector disposed on the second substrate, and the first connector and the second connector are aligned in a direction perpendicular to the first substrate and the second substrate.

18. The information processing apparatus of claim 17, wherein the plurality of folds of the flexible foldable substrate are between the first connector and the second connector in the direction perpendicular to the first substrate and the second substrate.

19. The information processing apparatus of claim 1, further comprising:
a flexible substrate including a wiring pattern electrically connected to the tamper detection circuit and covering the wall surface portion of the frame member,
wherein the flexible substrate is further between portions of the first substrate and the frame member which abut and between portions of the second substrate and the frame member which abut.

20. The information processing apparatus of claim 1, wherein, when the frame member contacts the first substrate and the second substrate, a length of each of the conductive members is greater than or equal to the distance between the first substrate and the second substrate.

* * * * *